(No Model.)

J. T. HAWKINS.
FRICTIONAL LOCK NUT.

No. 318,618. Patented May 26, 1885.

Witnesses:
John Tully
Francis P. Reilly

Inventor:
John T. Hawkins
by P. B. Voorhees
Attorney.

N. PETERS, Photo-Lithographer, Washington, D. C.

UNITED STATES PATENT OFFICE.

JOHN T. HAWKINS, OF TAUNTON, MASSACHUSETTS.

FRICTIONAL LOCK-NUT.

SPECIFICATION forming part of Letters Patent No. 318,618, dated May 26, 1885.

Application filed September 12, 1884. (No model.)

*To all whom it may concern:*

Be it known that I, JOHN T. HAWKINS, of Taunton, in the county of Bristol and State of Massachusetts, have invented a new and useful frictional check-nut or lock-nut for preventing bolts from either turning in or backing out of their holes when subjected to the wearing effects of shocks or jars, which invention is fully set forth and illustrated in the following specification and accompanying drawings.

The object of this invention is to provide a simple and efficient means for preventing screws or bolts—such as are used for adjusting purposes—from working loose through the wearing of their threads, and from being disturbed from any desired position of adjustment by the vibration of the machine to which they are attached, or by other accidental causes. This check-nut or lock-nut is to be distinguished from the ordinary lock-nuts designed to be held rigidly in a given position upon their bolts, said nut being designed exclusively to offer more or less resistance to the turning of the bolt or screw which it encompasses, while leaving it free to turn under a sufficient pressure applied for that purpose.

The invention consists of the parts or forms as generally and specifically set forth in the claims.

Figure 4:
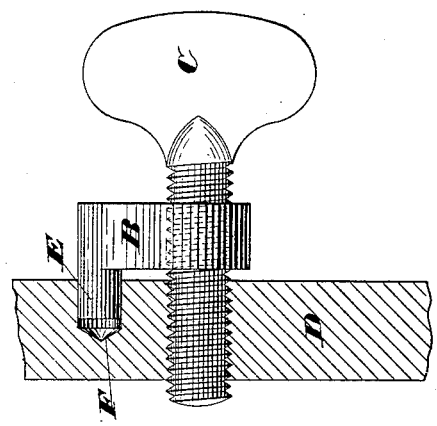
Figure 3:
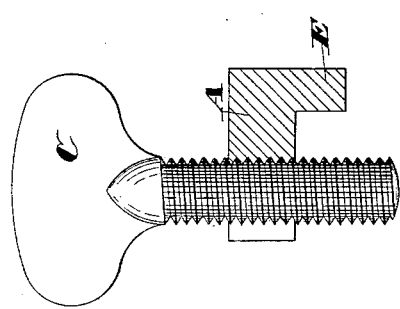
Figure 2:
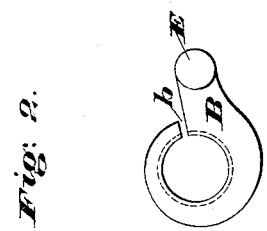
Figure 1:
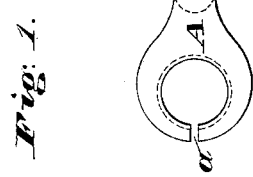

In said drawings, Figures 1 and 3 illustrate one form in which the same resistance of nut and its bolt or screw is offered to the turning of the screw in either direction. Figs. 2 and 4 illustrate another slightly-modified form of nut offering greater resistance to the screw's being withdrawn from it than to its being screwed into said nut.

One very important application of this invention is to the screws for adjusting the fountain-blades of printing-presses. In the fountains of printing-presses these screws, as usually made, (no matter how nicely adjusted,) will from constant wear become loose in their tapped holes and become liable to turn and back out from the vibration of the machine, thus disturbing the adjustment of the ink film upon the fountain-roller.

In said figures of the drawings, the letter A indicates a nut slotted at $a$; B, a nut slotted at $b$; C, a thumb screw or bolt, and D the metal into which the screw is tapped. In either case said nuts have formed on one side a cylindrical projection, E, which enters a corresponding cylindrical hole, F, in the metal D to prevent the turning of the nuts when the screw C is rotated.

In making this check-nut it is either tapped with a tap slightly smaller than that used for the tapped hole in the metal D, so that when either of the slots $a$ or $b$ is cut the nut shall elastically clamp the screw C and offer considerable resistance to the rotation of the screw within it; or, if said nuts be tapped with a tap of the size required for the easy running of the screw C in the metal D, they may be closed up slightly with a hammer after the cutting of said slots $a$ or $b$. Wherever, therefore, these nuts are used, the screws C may be made to run freely in their tapped holes in the metal D and be securely held from accidental rotation by the frictional clamping of the nuts A or B, as the case may be.

The nut A, being slotted centrally, so as to leave the metal symmetrically proportioned at either side of the slot, will simply clamp the screw C and offer equal resistance to its rotation in either direction within said nut. Constructed as shown at B, however, the nut is slotted and proportioned so as to distribute its metal surrounding the screw in increasing thickness in the direction the screw is turned to enter the nut, or in diminishing thickness in the direction the screw is turned to be withdrawn from the nut; the result being that in turning the screw in the direction to enter into the nut it tends by the frictional resistance offered by the nut to open the nut more or less and release itself to some extent from the clamping action of the nut upon it, while in turning the screw in the direction to withdraw it the frictional resistance of the nut tends to draw the nut itself more closely into contact with the screw and increase its clamping action upon the screw, thus making the withdrawal of the screw more difficult than the operation of screwing it in.

It is evident that, instead of the pin E upon the nut, a pin or other projection in the metal supporting the nut may be used to prevent the nut from turning.

Having thus fully described my said improvements, as of my invention I claim—

1. A frictional check-nut or lock-nut having a threaded bore slotted on one side, and provided with an offset and pin, as E, for entering into a hole in the material into which said nut's bolt is tapped, substantially as and for the purposes set forth.

2. A frictional check-nut or lock-nut having a threaded bore and its material surrounding said bore graduated to vary in thickness, slotted at its thinnest part, substantially as shown in Fig. 2, and provided with means, substantially as described, for clamping said nut to the material into which said nut's bolt is tapped, whereby said nut is caused to automatically clamp said bolt against being screwed out of said nut, and to release said bolt when screwed into said nut, substantially as set forth.

JOHN T. HAWKINS.

Witnesses:
JOHN TULLY,
JAMES E. KEESE.